(12) United States Patent
Hwang et al.

(10) Patent No.: US 9,569,063 B2
(45) Date of Patent: *Feb. 14, 2017

(54) MOBILE TERMINAL AND CONTROL METHOD THEREOF

(71) Applicant: LG ELECTRONICS INC., Seoul (KR)

(72) Inventors: Inyong Hwang, Seoul (KR); Hyundong Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

This patent is subject to a terminal disclaimer.

(21) Appl. No.: 14/582,860

(22) Filed: Dec. 24, 2014

(65) Prior Publication Data

US 2015/0121304 A1    Apr. 30, 2015

Related U.S. Application Data

(63) Continuation of application No. 13/006,925, filed on Jan. 14, 2011, now Pat. No. 9,116,594.

(30) Foreign Application Priority Data

Jan. 19, 2010  (KR) .................... 10-2010-0004903
May 26, 2010  (KR) .................... 10-2010-0049297

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0488* | (2013.01) |
| *G06T 3/40* | (2006.01) |
| *G09G 5/14* | (2006.01) |

(52) U.S. Cl.
CPC .......... *G06F 3/0481* (2013.01); *G06F 3/0482* (2013.01); *G06F 3/0488* (2013.01); *G06F 2203/04803* (2013.01); *G06T 3/40* (2013.01); *G09G 5/14* (2013.01)

(58) Field of Classification Search
CPC .................................................. G06F 3/0481
USPC ........................................ 345/173; 715/803
See application file for complete search history.

(56) References Cited

U.S. PATENT DOCUMENTS

| | | | |
|---|---|---|---|
| 5,699,535 | A | 12/1997 | Amro |
| 5,990,889 | A | 11/1999 | Amro |
| 6,008,809 | A | 12/1999 | Brooks |
| 8,140,058 | B2 | 3/2012 | Park |
| 2008/0155481 | A1 | 6/2008 | Kim et al. |
| 2008/0220748 | A1 | 9/2008 | Park |
| 2009/0013282 | A1 | 1/2009 | Mercer |
| 2010/0066698 | A1 | 3/2010 | Seo |
| 2010/0088634 | A1 | 4/2010 | Tsuruta et al. |

FOREIGN PATENT DOCUMENTS

| | | |
|---|---|---|
| CN | 10126388 A | 9/2008 |
| CN | 101606124 A | 12/2009 |

(Continued)

*Primary Examiner* — Javid A Amini
(74) *Attorney, Agent, or Firm* — Birch, Stewart, Kolasch & Birch, LLP

(57) ABSTRACT

A mobile terminal is provided that includes a display unit configured to display one or more windows at a time, and a controller configured to generate a first window and a second window separate from the first window when an event occurs in the first window. The controller is configured to control the display unit to display at least one of the first window and the second window. Methods for controlling the mobile terminal are also provided.

18 Claims, 25 Drawing Sheets

(56) References Cited

FOREIGN PATENT DOCUMENTS

| | | |
|---|---|---|
| EP | 0 961 200 A2 | 12/1999 |
| KR | 10-2005-0091246 A | 9/2005 |
| KR | 10-2008-0039642 A | 5/2008 |
| KR | 10-2008-0046810 A | 5/2008 |
| KR | 10-2008-0051573 A | 6/2008 |
| KR | 10-0869950 B1 | 11/2008 |
| KR | 10-2010-0032660 A | 3/2010 |

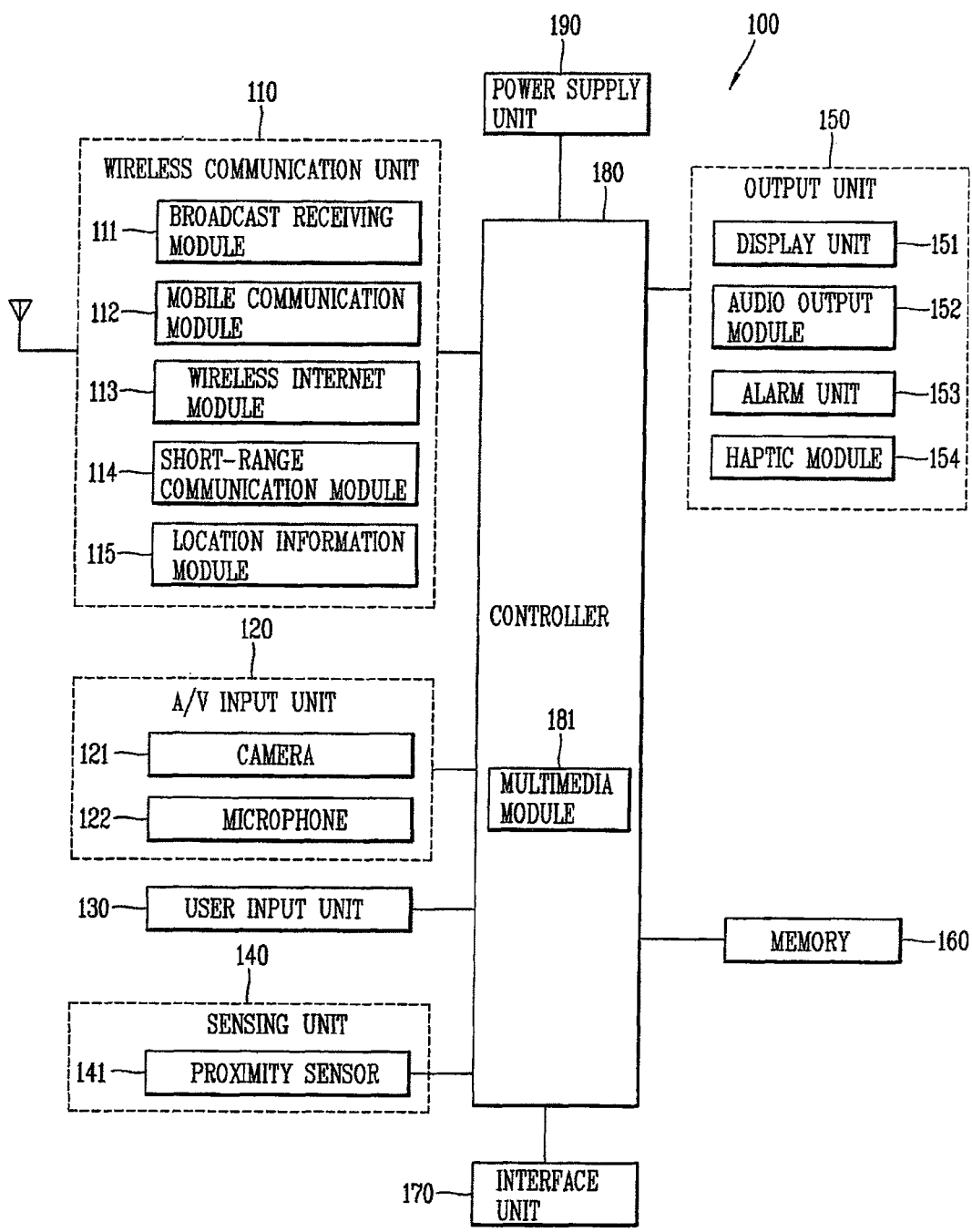

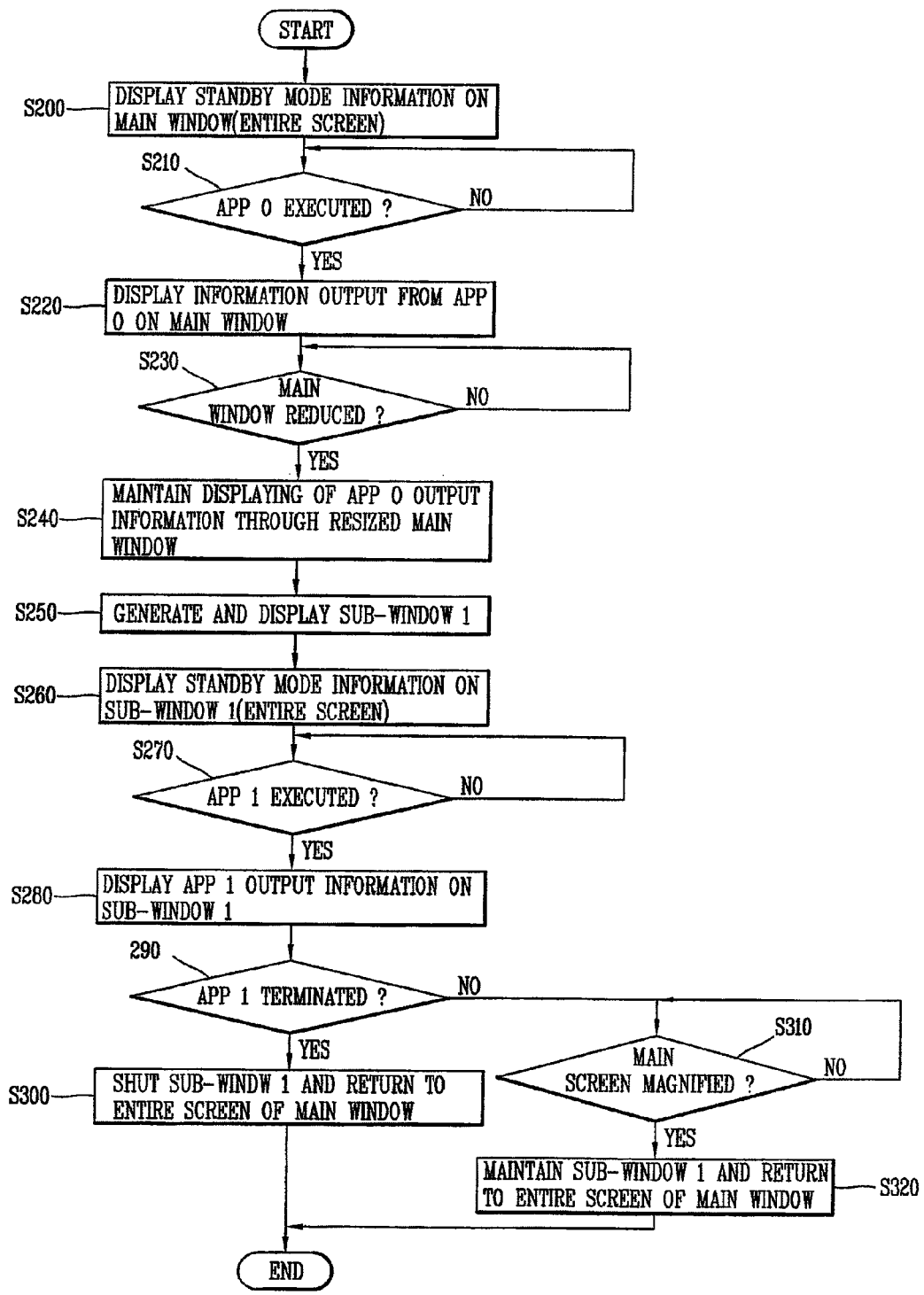

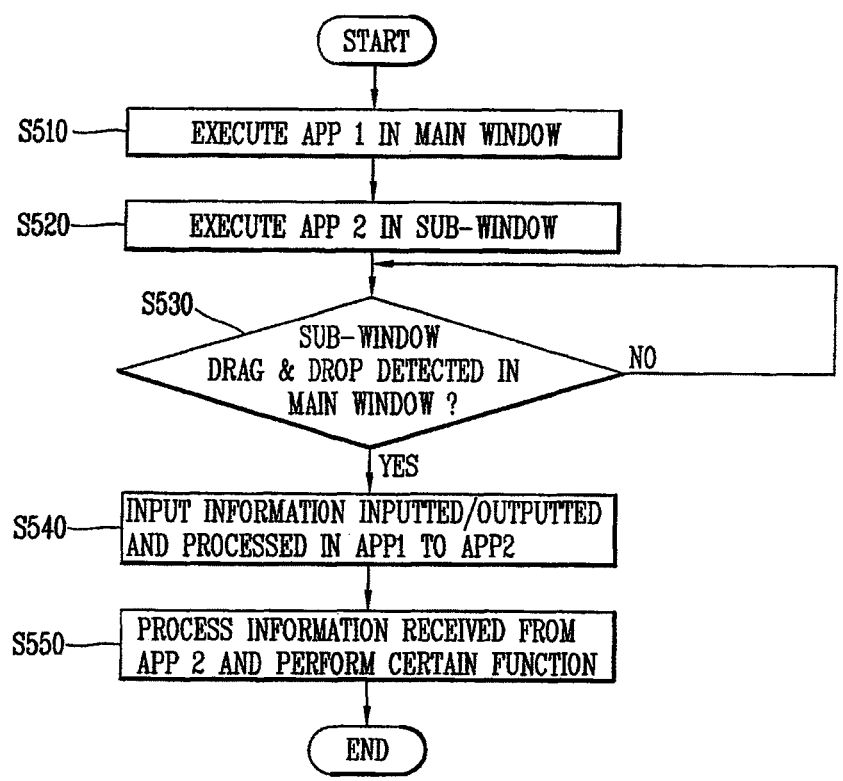

MOBILE TERMINAL AND CONTROL METHOD THEREOF

CROSS-REFERENCE TO RELATED APPLICATIONS

This application is a Continuation of copending application Ser. No. 13/006,925, filed on Jan. 14, 2011, which claims priority under 35 U.S.C. §119(e) to Korean Application No. 10-2010-0049297, filed on May 26, 2010 and to Korean Application No. 10-2010-0004903, filed on Jan. 19, 2010, all of which are hereby expressly incorporated by reference into the present application.

BACKGROUND OF THE INVENTION

Field of the Invention

The present invention relates to a mobile terminal providing a multitasking environment by adjusting the size of a screen, and a control method thereof.

Description of Related Art

In general, terminals may be divided into a mobile or portable terminal and a stationary terminal according to whether or not terminals are movable. In addition, mobile terminals may be divided into a handheld terminal and a vehicle mount terminal according to whether or not users can directly carry it around.

As the functions of terminals are becoming more diverse, terminals can support more complicated functions such as capturing images or video, reproducing music or video files, playing games, receiving broadcast signals, and the like. By comprehensively and collectively implementing such functions, mobile terminals are embodied in the form of a multimedia player or device.

In order to support and increase functions of the terminals, improvement of structural part and/or software part of terminals may be considered.

However, in the related art, when the user receives a call or a text message while using a supplementary function of a mobile terminal, the user must stop or temporarily stop the operation of the supplementary function or the display to receive the call or check the text message. Also, in the related art, even when multitasking is available to be performed, because an application displays information through the entire screen, the user must change the application displayed on the entire screen to perform multitasking. In addition, the related art has a problem in that it is not easy for another application to use information, which is inputted or outputted in an application being executed, causing a user inconvenience in using the different application.

BRIEF SUMMARY OF THE INVENTION

Accordingly, one object of the present invention is to provide a mobile terminal having an input method which is different from the conventional one.

Another object of the present invention is to provide a mobile terminal capable of displaying an event that occurs or information processed by a different application while a user is executing a certain application along with the application being currently executed according to a user intention, and facilitating an exchange of information between the executed applications.

To achieve the above objects, there is provided a mobile terminal including: a display on which a window is displayed; and a controller configured to provide control to generate at least one second window discriminated or differentiated from a first window, when an event occurs in the first window.

The window may include a main window of an upper layer and at least one sub-window of a lower layer, and when a resizing command of the main window is received, the controller may control the display unit to display a resized main window and the sub-window at an outer side such that the sub-window does not overlap with the resized main window.

The controller may provide control to display first and second applications on the first and second windows, respectively, the second application may correspond to the occurring event and the controller may provide control to display the second application on the second window according to a first user input.

When the event occurs, the controller may control the display unit to display notification information indicating the occurrence of the event.

The notification information may be at least one of an icon and a bar which corresponds to the occurring event.

The event may be any one of a message reception, a video call signal, a voice call signal reception, and an alarm output.

The first user input may be a touch motion of touching down or up the notification information or dragging the notification information.

The controller may extract information corresponding to the first application according to the second user input and control the second application to process the extracted information.

The second user input may be a touch motion of dragging from the first window to the second window.

The mobile terminal may further include: a wireless communication unit, wherein the controller controls the wireless communication unit to transmit the extracted information to a counterpart terminal through the second application.

The first application may be any one of a Web browser, navigation, broadcast viewing, video reproducing, camera driving, an e-book reader application.

An indicator for receiving the resizing input may be displayed at one edge of the main window, and when the indicator is touched down or up or dragged, the controller may provide control to execute resizing of the main window.

The indicator may display an application being executed in the sub-window which overlaps with the main window.

In case of a plurality of sub-windows, the plurality of sub-windows may be disposed in a certain direction on the basis of their size and the order according to which they have been generated.

The controller may provide control to divide the area of the display unit according to the number of sub-windows.

When a touch input is generated, the controller may control the display unit to change the positions of the plurality of sub-windows and display the plurality of sub-windows.

When a touch input occurs, the controller may provide control to interchange the main window and the sub-window.

To achieve the above objects, there is provided a method for controlling a mobile terminal, including: displaying a window on a display unit; and when an event occurs on a first window; generating al least one second window discriminated from the first window.

The window may include a main window of an upper layer and at least one sub-window of a lower layer, and in displaying the window on the display unit, when a resizing command of the main window is received, a resized main window and the sub-window at an outer side may be displayed such that the sub-window does not overlap with the resized main window.

The method may further include: displaying first and second applications on the first and second windows, respectively, wherein the second application may correspond to the occurring event and may be displayed on the second window according to a first user input.

The method may further include: when the event occurs, displaying notification information indicating the occurrence of the event on a display unit.

The method may further include: extracting information corresponding to the first application, and processing the extracted information by the second application.

The method may further include: transmitting the extracted information to a counterpart terminal through the second application.

The event may be any one of a message reception, a video call signal, a voice call signal reception, and an alarm output.

The first user input may be a touch motion of touching down or up the notification information or dragging the notification information.

The second user input may be a touch motion of dragging from the first window to the second window.

According to exemplary embodiments of the present invention, a multitasking environment which can be easily regulated by the user is provided. Also, a task currently performed by the user is not interfered with by an event, or the like, which occurs while a main application is being executed, and at the same time, the user can easily check occurring event at a desired time. Also, when the user wants to perform a different operation along with the main application, the user can easily select an application desired to be executed without interfering with the current operation. In addition, the user can easily check several applications which are being concurrently executed.

In addition, information input to or output from one of applications which are concurrently executed can be easily used by a different application which is being executed, thereby providing a more convenient multitasking environment to the user.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 1 is a schematic block diagram of a mobile terminal according to an exemplary embodiment of the present disclosure;

FIG. 9 is a flow chart illustrating the process of controlling the main window and the sub-window when a user wants to execute another application while one application is being executed according to an exemplary embodiment of the present invention;

FIG. 16 is a flow chart illustrating the process of the exemplary embodiments described with reference to FIGS. 13A to 15D.

DETAILED DESCRIPTION OF THE INVENTION

Figure 2A:
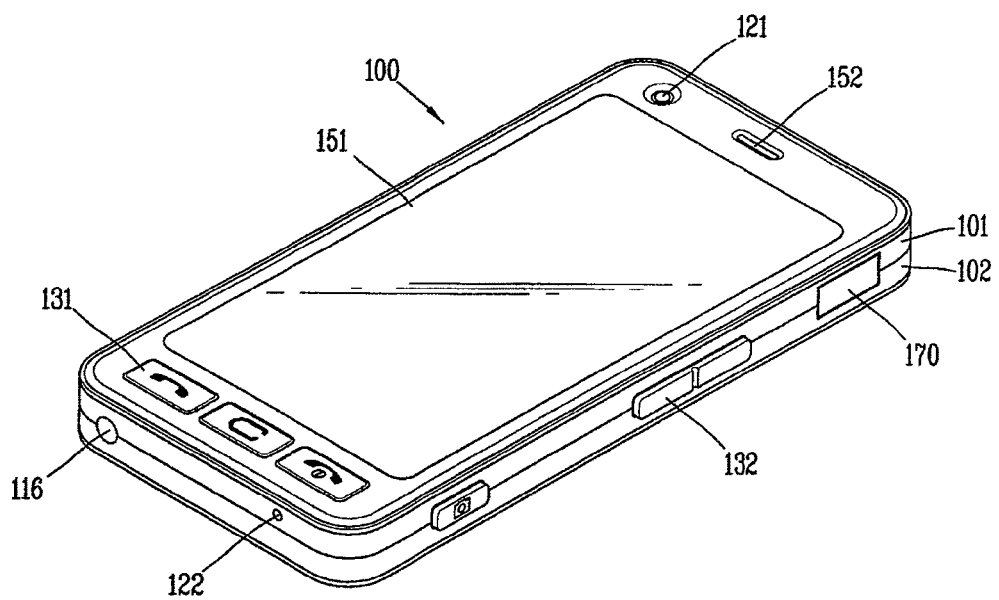
FIG. 2A is a front perspective view of the mobile terminal according to an exemplary embodiment of the present invention.

A mobile terminal according to exemplary embodiments of the present invention will now be described with reference to the accompanying drawings. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

The mobile terminal associated with the present disclosure may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present disclosure can be also applicable to the fixed types of terminals such as digital TVs, desk top computers, or the like, except for any elements especially configured for a mobile purpose.

FIG. 1 is a schematic block diagram of a mobile terminal according to an embodiment of the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile telininal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

FIG. 2A is a front perspective view of the mobile terminal according to an exemplary embodiment of the present invention.

The mobile terminal includes a bar type terminal body 101. Without being limited thereto, the present invention can be also applicable to a slide type mobile terminal, a folder type mobile terminal, a swing type mobile terminal, a swivel type mobile terminal and the like, including two or more bodies.

The terminal body includes a case (or casing, housing, cover, etc.) constituting the external appearance of the terminal body. In the present exemplary embodiment, the case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, camera 121, and the user input unit 130 (131, 132), the microphone 122, the interface 170, and the like, may be located on the terminal body, namely, mainly, on the front case 101.

The display unit 151 occupies the most portion of the front surface of the front case 102. The audio output unit 151 and the camera 121 are disposed at a region adjacent to one of both end portions of the display unit 151, and the user input unit 130 and the microphone 122 are disposed at a region adjacent to another of the both end portions. The user input unit 132, the interface 170, and the like, may be disposed at the sides of the front case 101 and the rear case 102.

The user input unit 130 is manipulated to receive commands for controlling the operation of the mobile terminal 100, and may include a plurality of manipulation units 131 and 132. The manipulation units 131 and 132 may be generally called a manipulating portion, and they can employ any method so long as they can be manipulated in a tactile manner by the user.

Content inputted by the first and second manipulation units 131 and 132 may be variably set. For example, the first manipulation unit 131 receives commands such as start, end, scroll, or the like, and the second manipulation unit 132 may receive commands such as adjustment of size of a sound outputted from the audio output unit 152 or conversion to a touch recognition mode of the display unit 151.

Figure 2B:
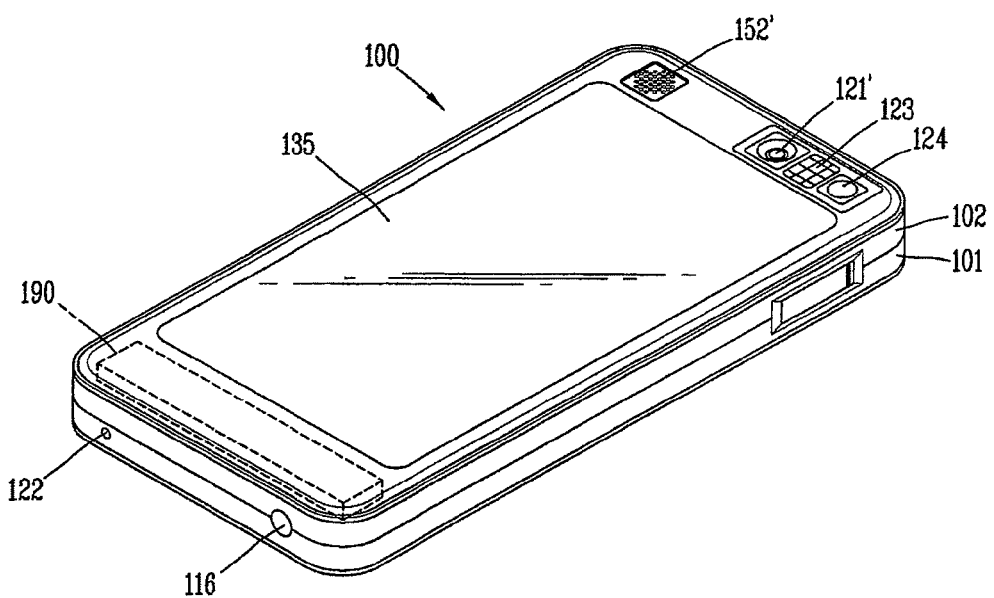
FIG. 2B is a rear perspective view of the mobile terminal according to an exemplary embodiment of the present invention.

FIG. 2B is a rear perspective view of the mobile terminal illustrated in FIG. 2A according to an exemplary embodiment of the present invention.

With reference to FIG. 2B, a camera 121' may additionally be disposed on a rear surface of the terminal body, namely, on the rear case 102. The camera 121' may have an image capture direction which is substantially opposite to that of the camera 121 (See FIG. 2A), and may support a different number of pixels (i.e., have a different resolution) than the camera 121.

For example, camera 121 may operate with a relatively lower resolution to capture an image(s) of the user's face and immediately transmit such image(s) to another party in real-time during video call communication or the like. Meanwhile the camera 121' may operate with a relatively higher resolution to capture images of general objects with high picture quality, which may not require immediately transmission in real time. The cameras 121 and 121' may be installed on the terminal such that they are rotated or popped up.

A flash 123 and a mirror 124, may be additionally disposed adjacent to the camera 121'. When an image of the subject is captured with the camera 121', the flash 123 illuminates the subject. The minor 124 allows the user to see himself when he wants to capture his own image (i.e., self-image capturing) by using the camera 121' of the second body 205.

An audio output unit 152' may be additionally disposed on the rear surface of the terminal body. The audio output unit 152' may implement a stereoscopic function along with the audio output unit 152 (See FIG. 2A), and may be used for implementing a speaker phone mode during call communication.

A broadcast signal receiving antenna 116 may be disposed at the side of the terminal body in addition to an antenna that supports mobile communications. The antenna 116 forming a portion of the broadcast reception module 111 (in FIG. 1) may be installed to be protracted.

A power supply unit 190 for supplying power to the mobile terminal 100 may be mounted on the terminal body 101. The power supply unit 190 may be installed in the terminal body or may be directly detached from the outside of the terminal body.

A touch pad for detecting a touch may be additionally mounted on the rear case 102. Such touch pad may be configured to be light-transmissive like the display unit 151. In this case, when the display unit 151 is configured to output visual information from both sides thereof, the visual information can be recognized through the touch pad 135. Information outputted to the both sides of the display unit 151 may be all controlled by the touch pad 135. Alternatively, a display may be additionally mounted on the touch pad 135, and a touch screen may be disposed on the rear case 102.

The touch pad 135 is operated in relation to the display unit 151 of the front case 101. The touch pad 135 may be disposed to be parallel to the rear side of the display unit 151. The touch pad 135 may have the same size or smaller than the display unit 151.

A control method that may be implemented in the terminal configured as described above according to exemplary embodiments of the present invention will now be described with reference to the accompanying drawings. The exemplary embodiments to be described may be used alone or may be combined to be used. Also, the exemplary embodiments to be described may be combined with a user interface (UI) so as to be used.

Figure 3A:
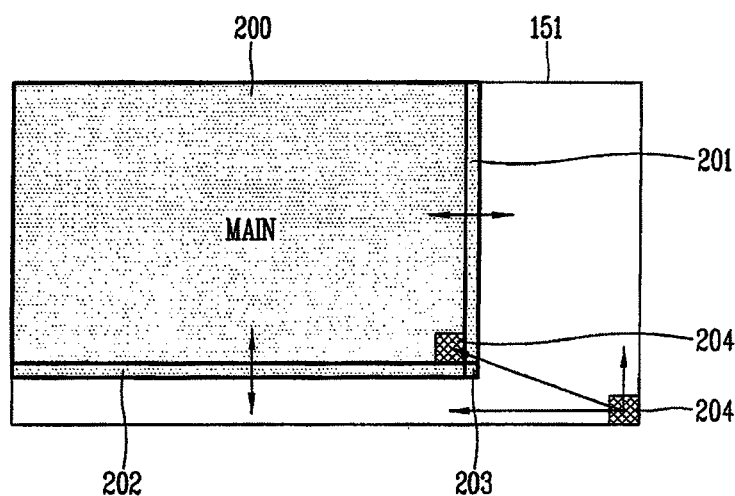
FIGS. 3A and 3B are views showing a main window and sub-windows according to an exemplary embodiment of the present invention.
Figure 3B:
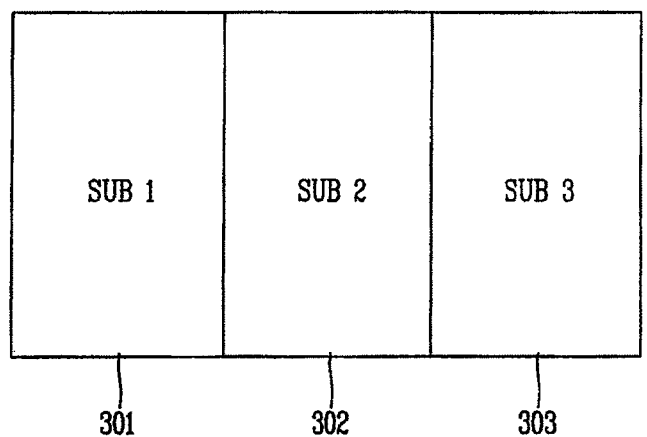

FIG. 3A shows a main window, FIG. 3B shows sub-windows, FIGS. 4A to 4E are views showing a main window and a sub-window actually displayed on a display unit according to an exemplary embodiment of the present invention.

According to an exemplary embodiment of the present invention, the display unit may have at least two layers. In an exemplary embodiment of the present invention, a main window may refer to a window of an upper layer, and a sub-window may refer to a window of a lower layer than that of the main window. Here, the window refers to a manipulated screen of the mobile terminal or a single screen displaying input and output information as an application is executed. The window may occupy the entire screen of the display unit or a portion of the entire screen.

Individual applications or the same application may be executed on each window. Functions that can be executed on each of the windows may include various applications such as a voice or video call, a text message reception or origination, text chatting, sound resource reproducing, playing games, the mobile Internet, a DMB, navigation, an E-book reader, a camera, a phone book, a document creator, and the like.

When the mobile terminal is in a standby mode (namely, the mobile terminal is in a state in which a particular application is not executed and waits for an event occurrence or a user input), or when one application is being executed, information is displayed through only a main window occupying the entire screen.

The size of the main window 200 may be changed according to a user input. For example, horizontal or vertical bars 201 and 202 are displayed at edges of the main window, and when the user drags the bars through a touch screen, the controller provides control to resize the main window according to the user's drag position. Or, an indicator 204 may be displayed at the corner of the main window 200 to allow the user to drag it to change the size of the main window. When the main window is resized, the controller newly outputs the information, which has been output through the main window, according to the size of the changed main window.

When two or more applications are executed (including execution of one application and the occurrence of one event), one is output through the main window and the other is output through a sub-window. Two or more sub-windows may be provided according to the number of executed applications. As for the sub-windows, the entire screen of a lower layer may be divided into sub-window (301, 302, 303) and simultaneously displayed, regardless of the relationship between the upper and lower layers.

As discussed above, the mobile terminal according to an exemplary embodiment of the present invention may be configured to include a display buffer (not shown) for recording and storing image data displayed on the display unit 151 such that the main window and at least one lower sub-window can be displayed, and a screen controller (not shown) configured to output image data to the display buffer to allow a corresponding screen image to be displayed on the display unit 151 and control the display buffer. The display buffer and the screen controller may be implemented to be included in the display unit 151. Here, the screen controller determines which screen image is to be displayed on the display unit 151 under the control of the controller 180 and control dividing or disposing of a screen window to allow a main window and/or sub-window to be output to the display unit 151. Also, one or more display buffers according to an exemplary embodiment of the present invention are controlled, and in this case, image data is output to the display buffer or updated according to a layer or position of a window to be output.

With reference to FIGS. 4A to 4E, only a portion of a sub-window of a lower layer which is not covered by the main window of an upper layer is displayed on the display unit. Also, the main window of the upper layer is not covered by the sub-window of the lower layer. Thus, by variably regulating the size of the main window, the main window and a portion of the sub-window which does not overlap with the main window can be displayed together.

Figure 4A:
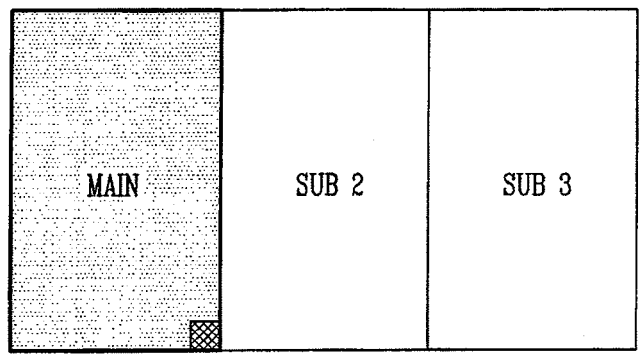
FIGS. 4A to 4E are views showing a main window and a sub-window actually displayed on a display unit according to an exemplary embodiment of the present invention.
Figure 4B:
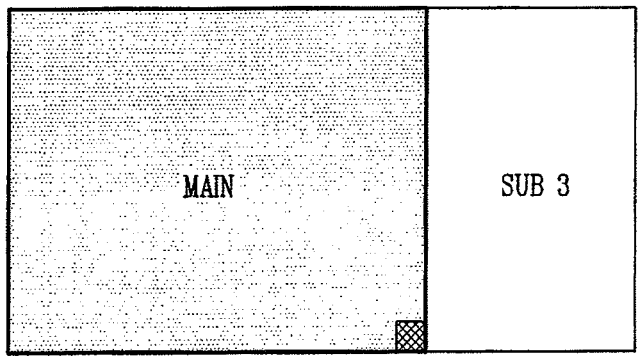
Figure 4C:
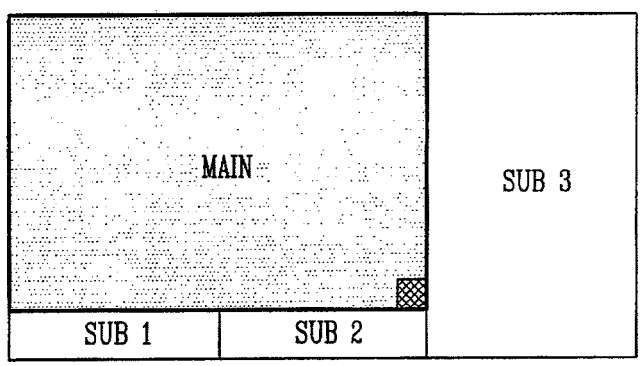
Figure 4D:
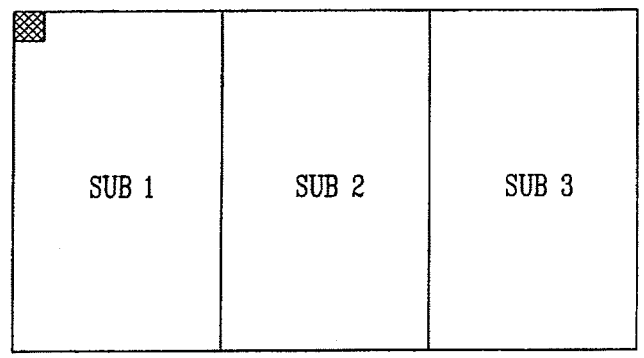
Figure 4E:
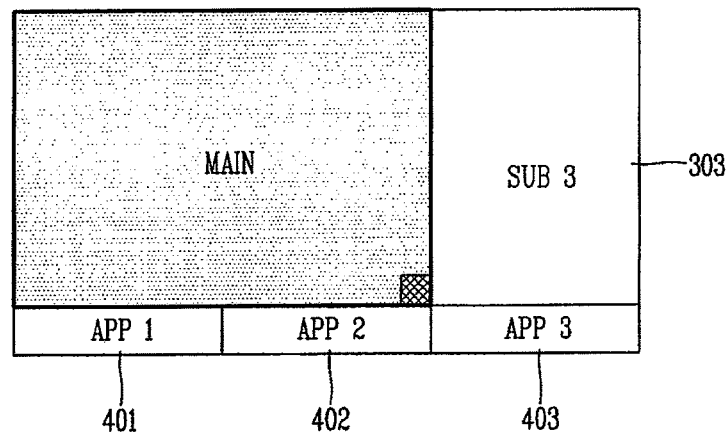

FIG. 4A shows a case in which the size of the main window is regulated to allow two sub-windows to be displayed. FIG. 4B shows a case in which one sub-window is displayed. FIG. 4C shows a case in which one sub-window an portions of two sub-window are displayed. FIG. 4D shows a case in which the main window is reduced to its maximum level such that the main window is not displayed and three sub-windows are displayed. With reference to FIG. 4E, the name 401, 402, and 403 of the applications being executed in each of the sub-windows are displayed at a lower portion of each of the sub-windows, and only the names 401 and 402 of the executed applications or the name 403 and the sub-window 303 may be displayed together by adjusting the size of the main window.

The size of the main window may be selected from among certain sizes as illustrated in FIGS. 4A to 4B, or may be successively changed according to a user input regardless of the disposition of the sub-window.

FIGS. 5A to 5E are views illustrating the disposition of a plurality of sub-windows.

Figure 5A:
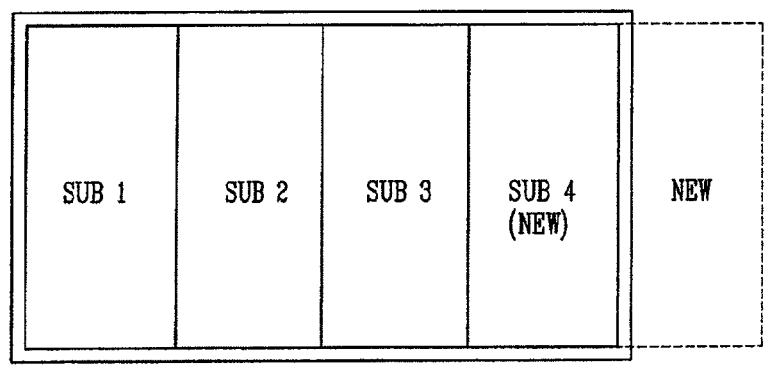
FIGS. 5A to 5E are views illustrating the disposition of a plurality of sub-windows.
Figure 5B:
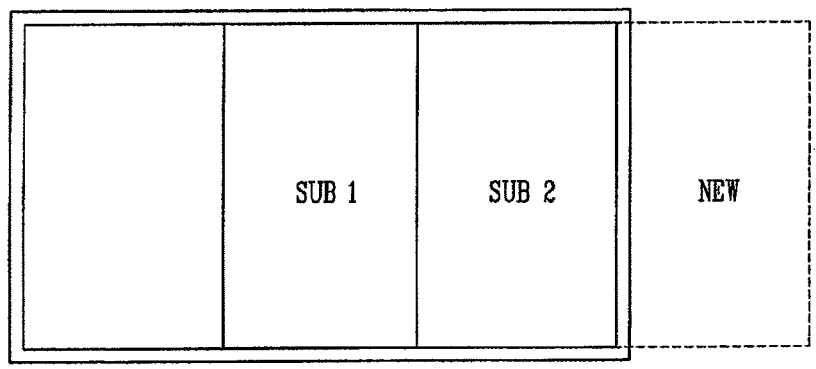

The size of each of the sub-windows may vary depending on the number of the sub-windows, or may be fixed. With reference to FIG. 5A, when there are four sub-windows, each sub-window has a size obtained by quartering the screen size of the overall display unit. If there are two sub-windows, each sub-window would have a size obtained by halving the screen size of the overall display unit.

Figure 5C:
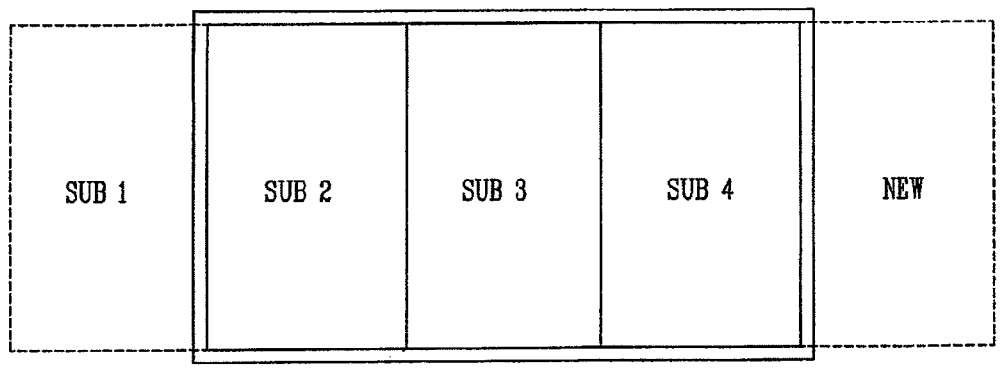
Figure 5D:
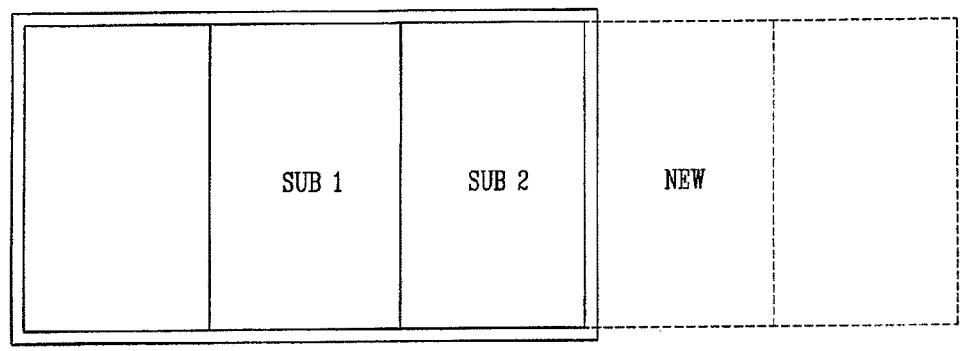
Figure 5E:
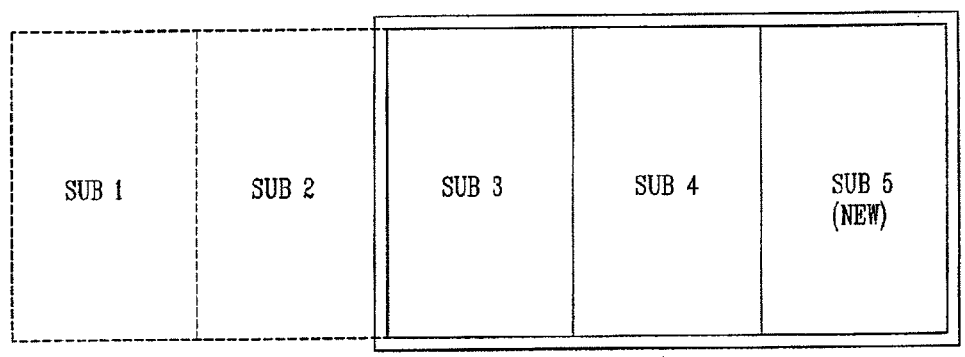

Differently, with reference to FIGS. 5B to 5E, each sub-window may have a sized size regardless of the number of the sub-windows. For example, each sub-window may have a size obtained by trisecting the screen size of the overall display unit. FIG. 5 shows a case in which two sub-windows are disposed and a far-right area is empty. FIGS. 5C to 5D show a case in which four sub-windows are disposed. The sub-windows displayed on the display unit can be interchanged by shifting the sub-windows disposed in a row according to a user input. In case of FIG. 5C, as the user drags the sub-windows to the left, sub-windows sub2, sub3, and sub4 are displayed (of course, they are displayed only when not covered by the main window. Of course, the array of sub-window may be shifted to the far right to display the sub-window sub1, while the other remaining space may remain empty (namely, the sub-windows are disposed in a row), or the sub-windows sub3 and sub4 (namely, the sub-windows may be disposed in a circular form).

Figure 6A:
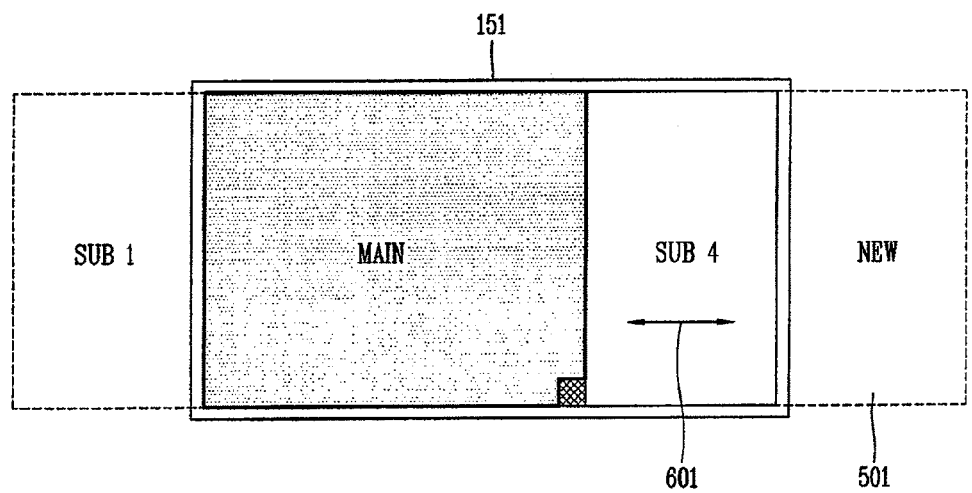
FIGS. 6A and 6B are views showing sub-windows and the main window described above with reference to FIGS. 5A to 5E.
Figure 6B:
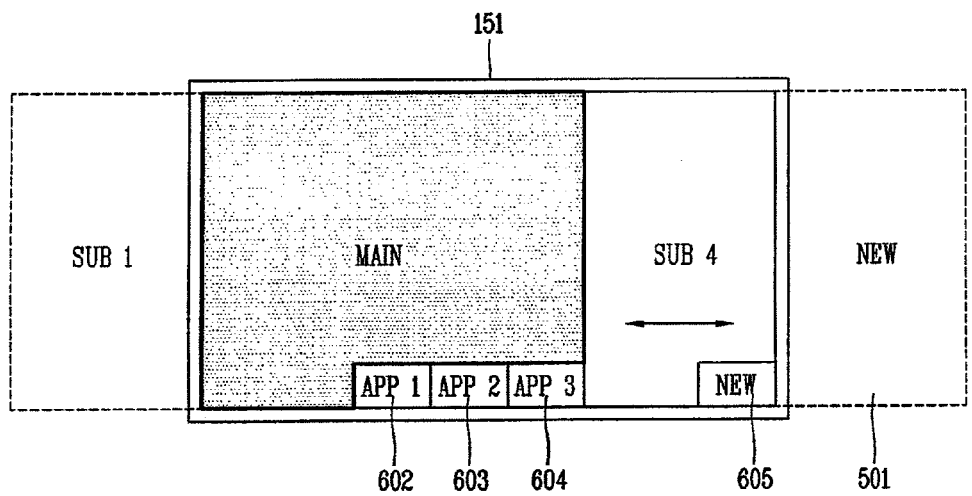

FIGS. 6A and 6B are views showing sub-windows and the main window described above with reference to FIGS. 5A to 5E. FIG. 6A shows a sub-window disposed like that of FIG. 5C and a main window resized to have a two-thirds size. As illustrated, only the sub-window sub4 is shown, while the sub-windows sub2 and sub3 are not shown as being covered by the main window. By dragging the displayed sub-window area, the user is able to shift the disposed sub-windows and change the resultantly displayed sub-windows.

With reference to FIG. 6B, indicators 602, 603, and 604 indicating sub-windows covered by the main window and an indicator 605 of a sub-window, which is positioned at a right side of the displayed sub-window and not displayed, may be displayed.

With reference to FIGS. 5A to 6B, the sub-windows are generated in the occurrence of an event such as an execution of an application by the user, a call signal reception, a text message reception, alarming while an application is being executed on a main window, and when the application executed according to a user's input or the like is terminated, the sub-windows become extinct. The plurality of sub-windows may be disposed in a row according to the sub-window generation order, to finally displayed order, the frequently displayed order, the order set by the user, and the like. For example, the first generated sub-window sub1 may be disposed at the far left, and the most recently generated sub-window sub4 may be disposed at the far right.

For example, a virtual sub-window (new) 501 to be newly generated may be positioned at a right side of the most recently generated sub-window. For example, in a state of being displayed as shown in FIG. 5C, when the user drags the sub-window to the left, the new sub-window sub5 502 is generated. A standby screen image, a manipulated screen image, an application list available for multitasking, and the like, may be displayed on the sub-window sub5, without executing a particular application. When the user simply drags the sub-window to the right without any other manipulation, the sub-window sub5 may become extinct. Or, as shown in FIG. 5A, it may be constantly displayed (503) like the already generated sub-windows.

Figure 7:
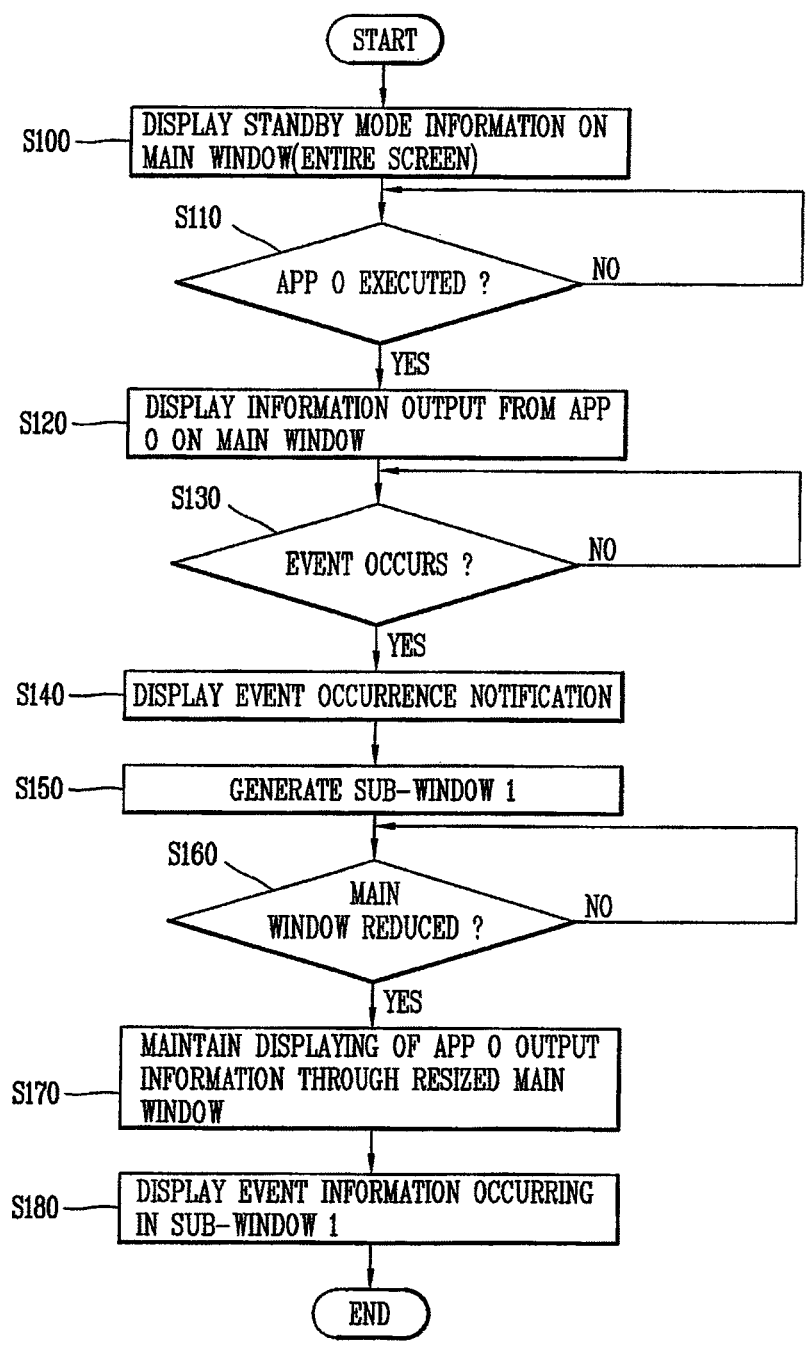
FIG. 7 is a flow chart illustrating the process of controlling a main window and a sub-window when an event occurs while an application is being executed according to an exemplary embodiment of the present invention.

FIG. 7 is a flow chart illustrating the process of controlling a main window and a sub-window when an event occurs while an application is being executed according to an exemplary embodiment of the present invention.

When the mobile terminal is turned on, a standby mode screen image is displayed on the main window of the display unit of the mobile terminal (step S100). As described above, the standby mode refers to a state in which various function keys or menu keys are displayed and a user's input or an event occurrence awaits.

When the user selects an application (App0) desired to be executed by using the menu key, or the like, displayed on the display unit (step S110), the controller loads the application selected by the user and executes it, and provides control to output information processed by the application through a main window of the display unit (step S120).

When the controller detects an occurrence of an event in the course of executing the application App0 (step S130), an indicator indicating the occurrence of the event, or the like, is displayed (step S140). The event may be a call signal reception, a text message reception, alarming, and the like, and the indicator may be an icon, a character box, and the like, indicating the corresponding event as generated.

With the indicator displayed, a sub-window with respect to the generated event is generated (step S150). The generated sub-window is not displayed until before a user's input, and the main window is maintained to be the same as before. Information regarding the event may be stored in the display buffer for the sub-window, or an application related to an event is executed and information processed and outputted accordingly may be stored in the display buffer for the sub-window.

In order to check the generated event, the user reduces the main window by dragging the bar at the edge of the main window or the indicator (step S160).

When the main window having the reduced size is input by the user, the controller provides control to continuously output the information, which is output from the application App0, through the main window having the size changed according to the size of the input main window (step S170).

At the same time, a sub-window not covered by the main window as the main window is reduced in size is displayed on the display unit, and event information, or the like, is displayed through the sub-window (step S180).

FIGS. 8A to 8F are views showing main windows and sub-windows displaying an event occurring while an application is being executed as described with reference to FIG. 7.

Figure 8A:
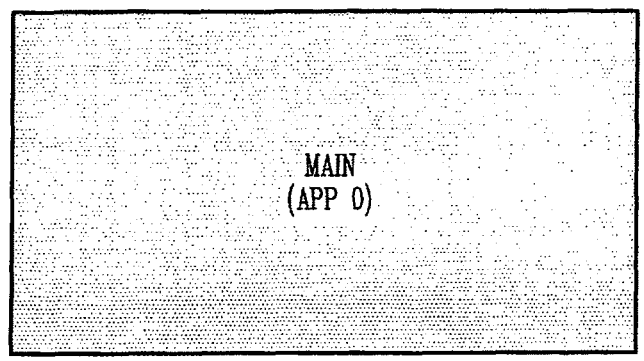
FIGS. 8A to 8F are views showing main windows and sub-windows displaying an event occurring while an application is being executed as described with reference to FIG. 7.

With reference to FIG. 8A, information processed by a certain application App0 is output through the main window occupying the entire screen of the display unit.

Figure 8B:
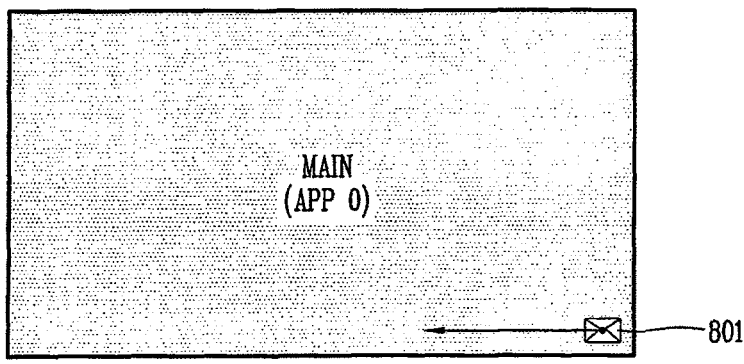

With reference to FIG. 8B, when a text message is received while the application App0 is executed, an indicator 801 having a shape of an icon indicating the text message reception is displayed along with a signal sound indicating the text message reception or without a signal sound. The indicator may blink until such time as the user checks it or for a certain period of time. Or, the indicator may serve as an indicator for regulating the size of the main window. In order to check the received text message, the user drags the indicator to the left.

Figure 8C:
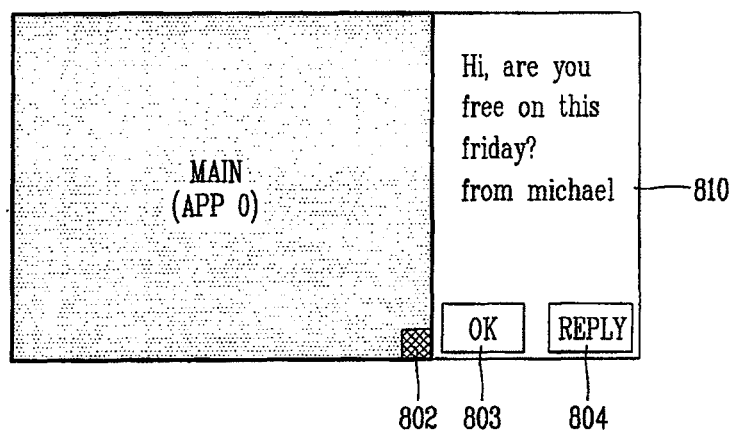

With reference to FIG. 8C, as the user drags the indicator, the size of the main window is reduced and a sub-window 810, which has been covered by the main window, is displayed. If there is no sub-window covered by the main window, the indicator may not be displayed or a meaningless indicator 802 may be displayed.

When the user checks the text message, the user may touch an OK key 803 to close the sub-window 810 on which the text message is displayed. When there is no any other sub-window, the main window is returned to an entire screen or a sub-window displaying a screen image of a standby mode may be displayed.

Figure 8D:
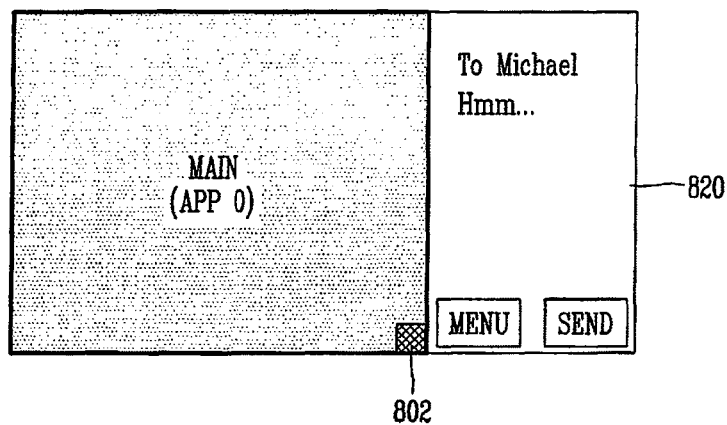

With reference to FIG. 8D, when a reply (804) key of a reception message checking sub-window 810 is touched, a sub-window 820 for sending a text message is displayed. The displayed information may be simply changed from the sub-window 810 for checking a reception message as shown in FIG. 8C, but a sub-window 820 different from the sub-window for checking a reception message may be generated. As described above, the same application may be executed in two or more windows. While the sub-window 820 for originating a message is generated, the sub-window 810 previously displayed for checking the reception message is shifted to the left and covered by the main window, not being displayed. An indicator 801 for indicating it may be displayed on the main window.

Figure 8E:
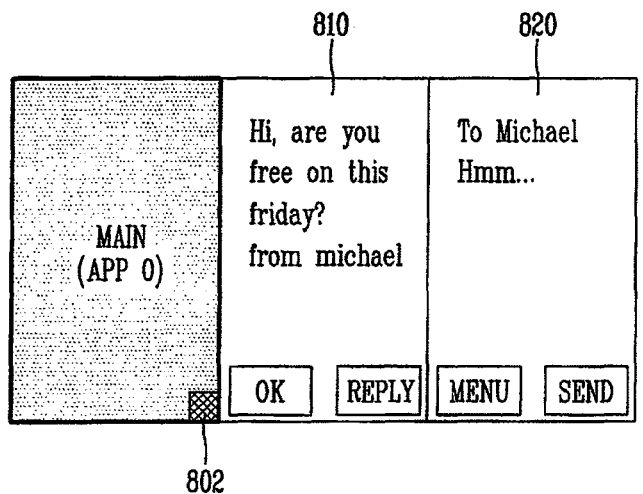

With reference to FIG. 8E, when the user drags the indicator 801 to the left, the sub-window 810 for checking a reception message, which has been covered, is displayed. The user may create a text message and send it, while viewing the received text message.

Figure 8F:
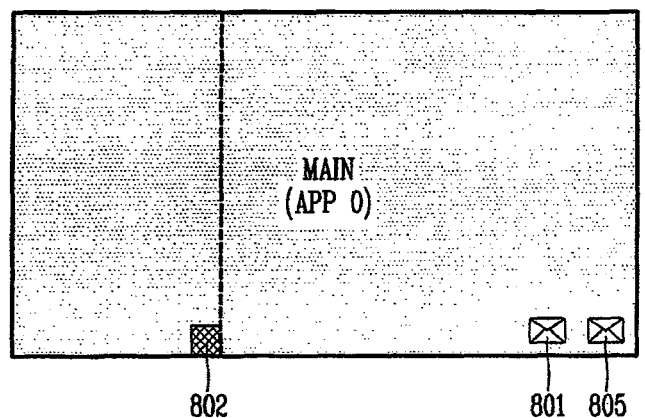

With reference to FIG. 8F, the user may drag the indicator 802 displayed in the main window in the course of checking and sending the text message (or the user may drag the bar displayed at the edge of the main window or simply drag the edge of the main window) to cover a portion of a sub-window, one sub-window, or the entire sub-windows. The covered sub-window are simply not shown, rather than being closed, and an application being executed in the sub-window is not affected. Indicators 801 and 805 indicating the applications executed by the covered sub-windows may be displayed on the main window occupying the entire screen.

FIG. 9 is a flow chart illustrating the process of controlling the main window and the sub-window when a user wants to execute another application while one application is being executed according to an exemplary embodiment of the present invention.

When the mobile terminal is turned on, a standby mode screen image is displayed on the main window of the display unit (step S200). As described above, the standby mode refers to a state in which various function keys or menu keys are displayed and a user's input or an event occurrence awaits.

When the user selects an application (App0) desired to be executed by using the menu key, or the like, displayed on the display unit (step S210), the controller loads the application selected by the user and executes it, and provides control to output information processed by the application through a main window of the display unit (step S220).

When the user wants to execute another application together while executing the application App0, the user drags the bar or the indicator at the edge of the main window to reduce the main window (step S230).

When the main window having the reduced size is input by the user, the controller provides control to continuously output the information, which is output from the application App0, through the main window having the size changed according to the size of the input main window (step S240).

Also, because there is no already generated sub-window, a sub-window is newly generated and displayed according to the reduction in size of the main window (step S250). Or, when the main window is reduced, an empty space is displayed, and as described above, when the user drags the empty space to the left, a new sub-window can be generated and displayed.

A standby mode screen image for displaying a list of applications to be executed or various function keys or menu keys may be displayed on the newly generated sub-window (step S260).

The user selects an application (App1) desired to be executed through the standby screen of the sub-window (step S270). The controller loads and executes the application selected by the user, and provides control to output information processed by the application through the sub-window of the display unit (step S280).

When the application (App1) executed on the sub-window according to the user input, or the like, is terminated, the controller closes the sub-window (step S300). Accordingly, the sub-window becomes extinct, and the main window can be enlarged to the entire screen. When the user enlarges the main window without terminating the application (App1) (step S310), the sub-window is maintained, rather than becoming extinct, and the information processed by the application App0 is output through the main window occupying the entire screen (step S320).

FIGS. 10A to 10G show main window and sub-windows displayed when the use wants to execute another application while one application is being executed as described with reference to FIG. 9.

Figure 10A:
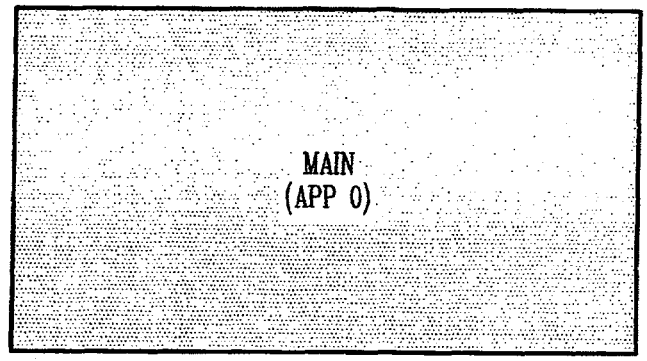
FIGS. 10A to 10G show main window and sub-windows displayed when the use wants to execute another application while one application is being executed as described with reference to FIG. 9.
Figure 10B:
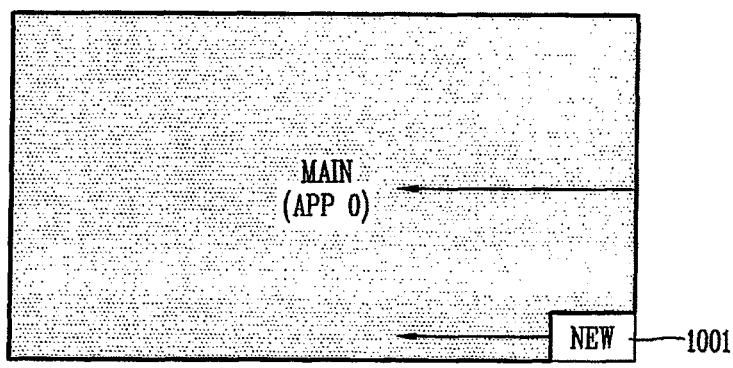

With reference to FIGS. 10A and 10B, information processed by a certain application (App0) is output through the main window occupying the entire screen of the mobile terminal (FIG. 10A). When the user wants to execute another application together in the course of executing the application App0, the user drags a bar or an indicator 1001 at the edge of the main window to reduce the main window. The indicator may have a form of an icon indicting that a sub-window is newly generated.

Figure 10C:
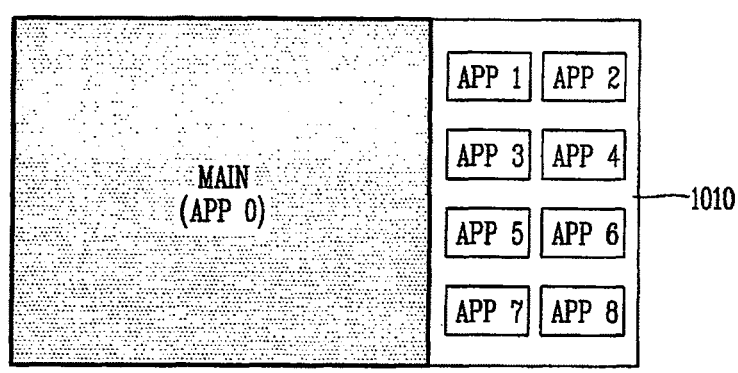

With reference to FIG. 10C, as user reduces the main window, a sub-window 1010 is displayed. A list of application that can be executable may be displayed on the newly generated sub-window 1010.

Figure 10D:
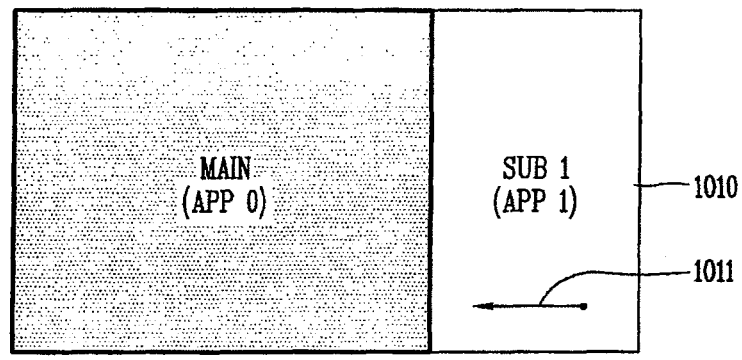

With reference to FIG. 10D, when the user selects an application from the application list, the controller executes the selected application (App1) and outputs information through the sub-window 101. When the user wants to execute another application while the application App1 is being executed through the sub-window 1010, the user drags the sub-window to the left as described above.

Figure 10E:
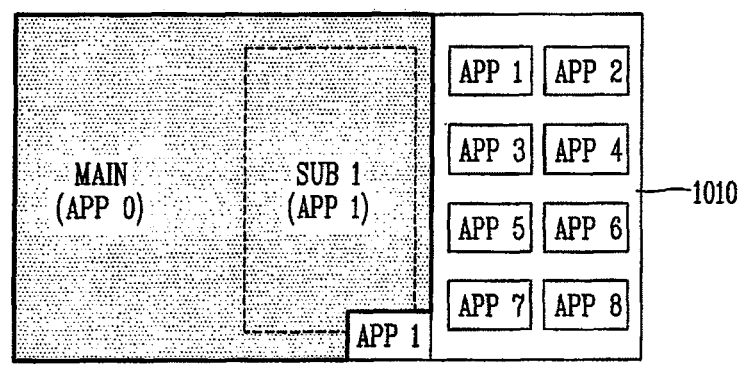

With reference to FIG. 10E, when there is a drag input in the course of executing the application App1 in the sub-window, a new sub-window 1020 is generated, and a standby screen image is displayed on the sub-window 102. The sub-window 1010 on which the application App1 is being executed is shifted to the left and covered by the main window, and an indicator 1012 indicating it is displayed on the main window. Of course, the user may further reduce the main window to the left to display both of the sub-windows 1010 and 1020.

Figure 10F:
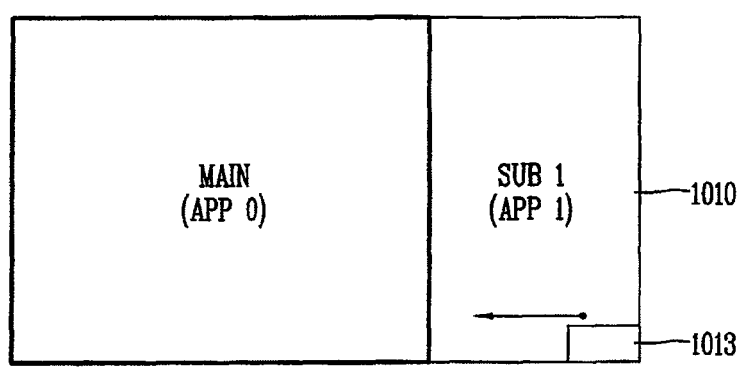
Figure 10G:
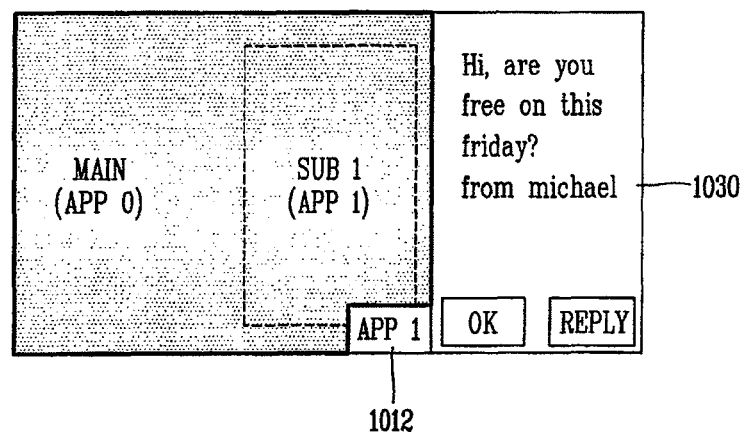

With reference to FIGS. 10F and 10G, when an event occurs while the application App1 is being executed on the sub-window 101, an indicator 1013 indicating the occurrence of the event may be displayed and blink. When the user drags the indicator or the sub-window to the left, the sub-window 1010 on which the application App1 is being executed is shifted to the left and covered, and a sub-window 1030 displaying information regarding the generated event is generated.

Figure 11:
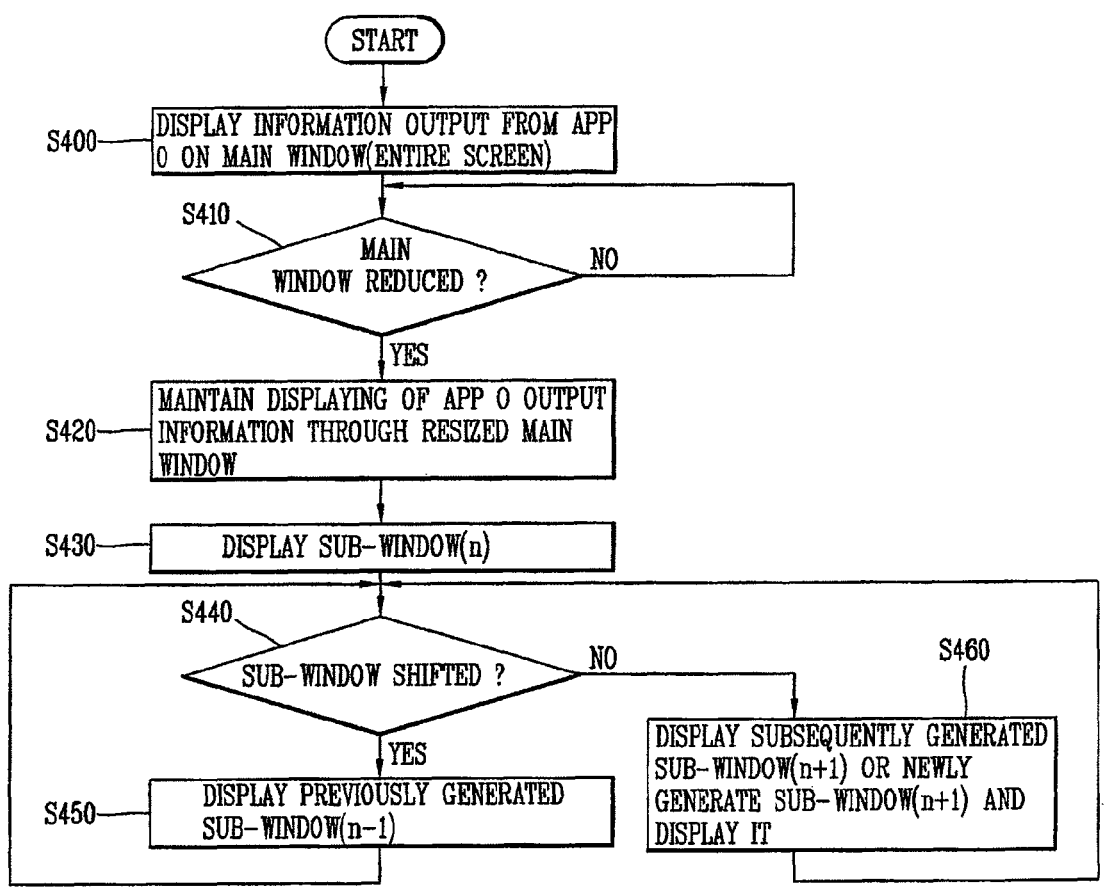
FIG. 11 is a flow chart illustrating the process of displaying a sub-window when a plurality of applications are executed through main windows and sub-windows.

FIG. 11 is a flow chart illustrating the process of displaying a sub-window when a plurality of applications are executed through main windows and sub-windows.

In a state in which information output from the application App0 through the main window occupying the entire screen is displayed (step S400), the user drags the bar or the indicator of the main window to reduce the main window in order to check a sub-window (step S410).

The controller reduces the main window and displays the output information of the application App0 through the reduced main window (step S420).

Also, the controller displays a sub-window (n) in a space generated according to the size reduction in the main window (step S430). As described above, one or more sub-windows may be displayed according to the size of the reduced main window. The displayed sub-window may be the most recently generated sub-window, the most recently displayed sub-window, and the like.

With the sub-window displayed (step S430), when the user want so change the sub-window being displayed, for example, the user may drag the displayed sub-window to the left or to the right to shift the sub-window(s) (step S440). Or the user may change the displayed sub-window by clicking or dragging the indicator with respect to each sub-window displayed on the main window or the sub-window.

When a drag is inputted in a first direction, e.g., when a first drag is inputted by the user, a sub-window (n−1), which has been generated before the displayed sub-window was generated, is displayed (step S450), and when a drag is inputted in a second direction, e.g., when a left drag is inputted, a later generated sub-window (n+1) may be displayed (step S460). When there is no later generated sub-window, a new sub-window is displayed and a standby mode screen image may be displayed.

Figure 12A:
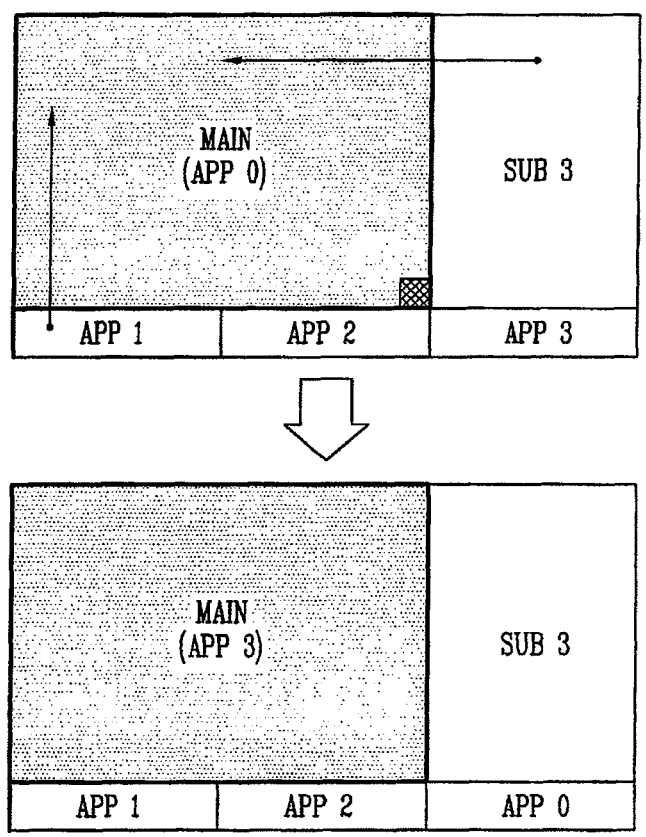
FIGS. 12A and 12B are views showing changing of applications output through main window and sub-windows.
Figure 12B:
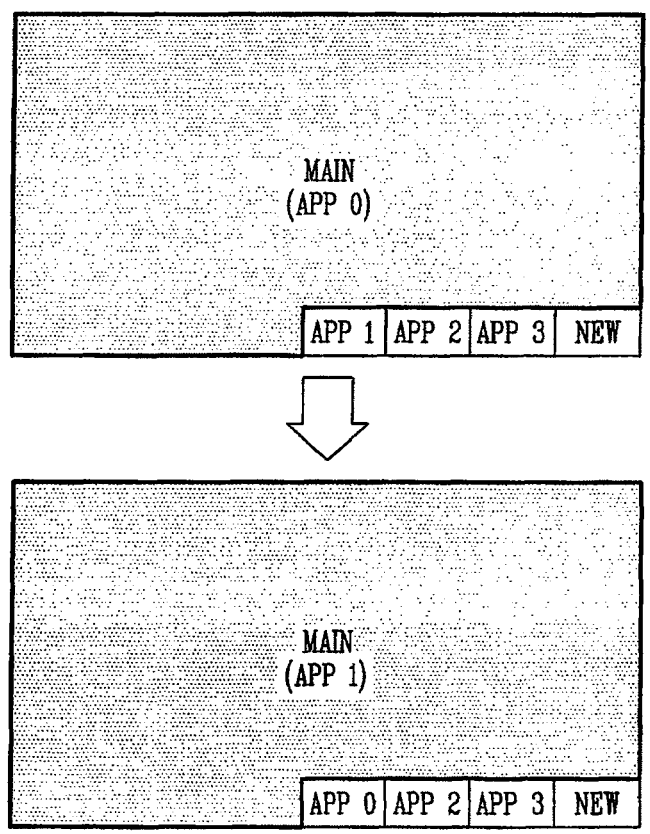

FIGS. 12A and 12B are views showing changing of applications output through main window and sub-windows. When two or more applications are being executed, information processed by the first executed application may be output through a main window, and the subsequently executed application may be output through a sub-window. When the user wants to output the application, which is being executed on the sub-window, through the main window, or vice versa, the application executed on the main window may be changed according to a user input.

With reference to FIG. 12A, with the main window and the sub-window displayed, when the user drags the sub-window sub3 to the main window or drags the name (App1) of the application executed in the sub-window to the main window, the application being executed in the main window is changed from the application App0 to the application App1 or App3 and the application App0 is executed in the sub-window.

With reference to FIG. 12B, the main window occupies the entire screen and indicators of applications executed in sub-windows covered by the main window are displayed on the main window. In this state, when the user drags one (App1) of the displayed indicators to the main window or double clicks the application App1, the application being executed in the main window is changed from the application App0 to the application App1, and the application App0 is executed in the sub-window.

In the above description, the main window and the sub-windows are positioned at upper and lower layers, respectively, and the sub-window of the lower layer not covered by the main window is displayed according to resizing of the main window, but the present invention is not limited thereto. The present invention can be applicable to any case in which displaying of a certain application through the main window is maintained and an event or a different application generated according to a user control can be displayed (on a sub-window) simultaneously.

For example, regardless of the relationship of upper and lower layers of a main window and a sub-window, the entire screen may be divided (into a main window display area and a sub-window display area) according to a user's resizing input to simultaneously display a main window and a sub-window.

Also, when a certain input (e.g., a touch input of an indicator) is detected without resizing a main window (so the main window occupies the entire screen), a sub-window may be displayed in the form of a picture-in-picture (PIP) on the main window. The divided sub-window display area or the PIP correspond to a portion not covered by the main window of the upper layer as described above, so the methods as described above with reference to FIGS. 3A to 12B can be applicable in the same manner. Besides, the present invention can be applicable to various cases in which two or more windows are displayed on the same screen.

Hereinafter, a method of simply using information, which is input or output or processed in each application, by a different application in a multitasking environment in which two or more windows are displayed on the same window will now be described in detail.

FIGS. 13A to 13D are views showing transmitting and receiving a message through a sub-window while a Web browser is being driven through a main window according to an exemplary embodiment of the present invention.

When the user drives a Web browser of the mobile terminal, the Web browser is displayed through a main window occupying the entire screen. When the user wants to send a particular Web page to a counterpart terminal by using a text message service, and the like, the text message creation application is driven and displayed on a sub-window as described above (See FIG. 13A).

Figure 13A:
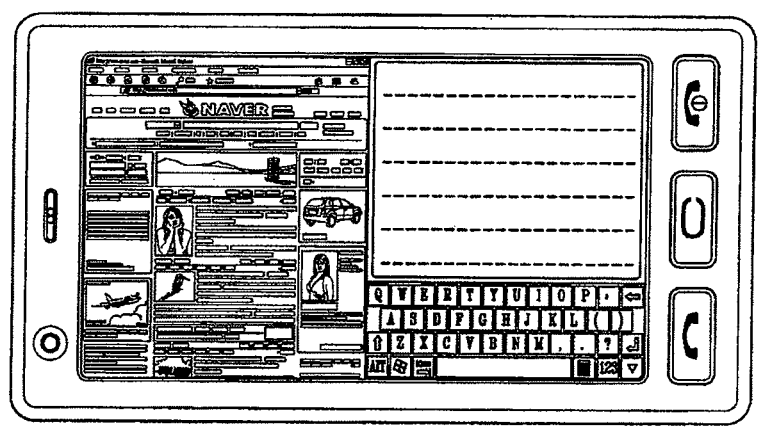
FIGS. 13A to 13D are views showing transmitting and receiving a message through a sub-window while a Web browser is being driven through a main window according to an exemplary embodiment of the present invention.
Figure 13B:
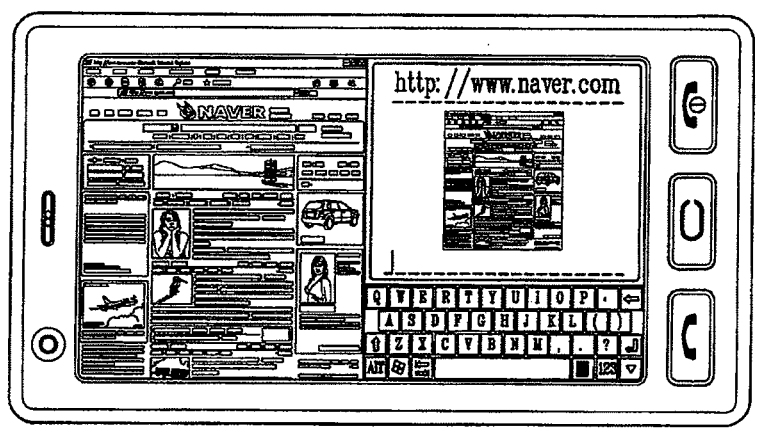

When a certain signal is input, the controller 180 inputs information processed by the application executed in the main window, namely, processed by the Web browser, to the application executed in the sub-window, namely, to the text message creation application (See FIG. 13B).

The certain signal may be a signal of dragging a Web page being displayed on the main window and dropping it to the sub-window on which the message creation application is being executed.

The information processed by the Web browser may be an Internet access address such as a URL related to the Web page being currently displayed, image information obtained by converting the currently output Web page into an image format such as a screen capture, or the like.

When the information is input to the text message creation application of the sub-window, the received URL and/or an image of the Web page is displayed on a text message creation window, and a text message, a phone number of a counterpart, and the like, are received from the user and the URL information and/or Web page image information to the counterpart terminal.

Figure 13C:
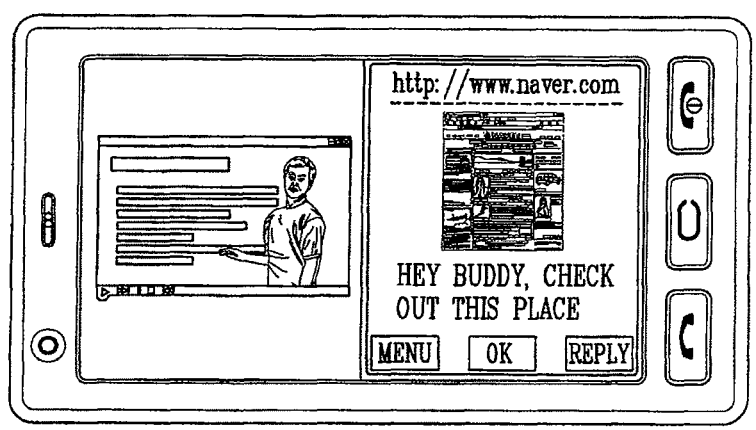
Figure 13D:
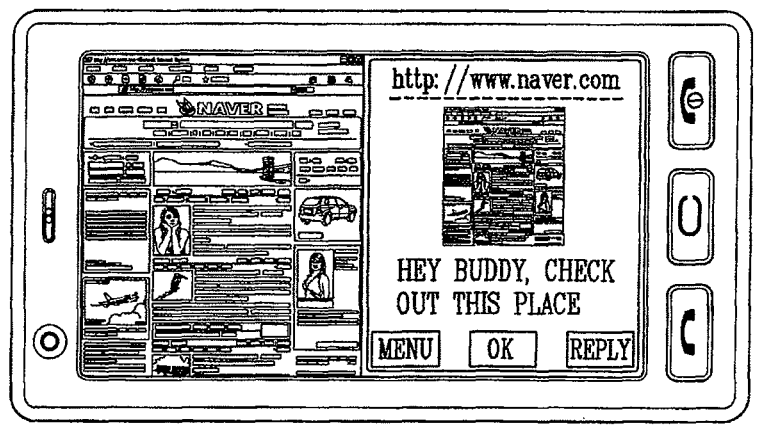

Upon receiving the message including the URL information and/or image information, the terminal discriminately displays the URL information and/or image information of the message (See FIG. 13C). When the user selects the displayed URL information and/or image information through a touch or the like, the controller 180 detects it and drives the Web browser to access the received corresponding Web page and display it on the main window or the sub-window (See FIG. 13D).

Figure 14A:
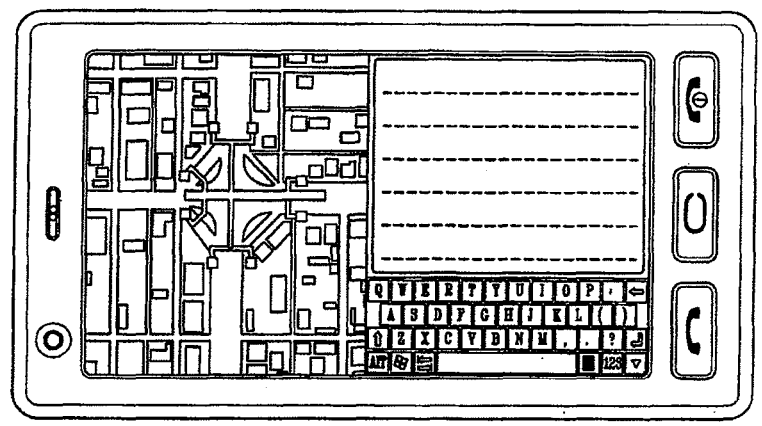
FIGS. 14A to 14C are views showing transmitting and receiving a message through a sub-window while a navigation is being executed through a main window according to an exemplary embodiment of the present invention.
Figure 14B:
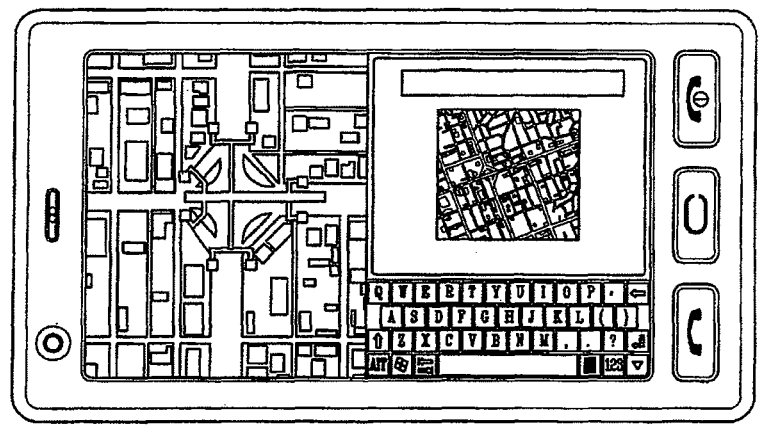
Figure 14C:
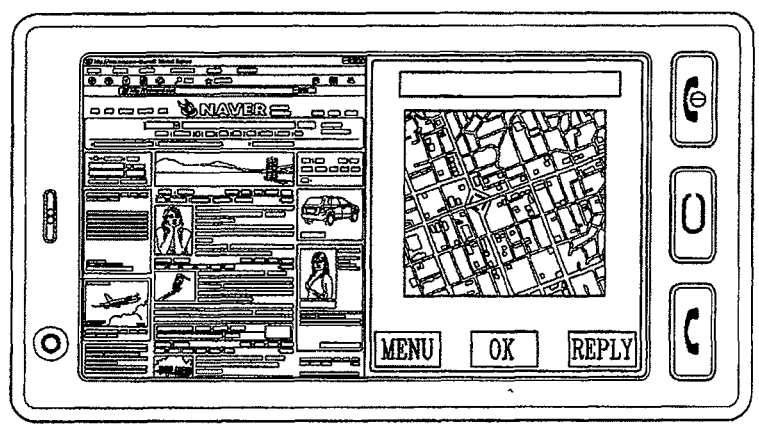

FIGS. 14A to 14C are views showing transmitting and receiving a message through a sub-window while a navigation is being executed through a main window according to an exemplary embodiment of the present invention.

When the user drives a navigation of the mobile terminal, a map is displayed through a main window occupying the entire screen. When the user wants to transmit information regarding the currently displayed map, the user's current location, a destination, a movement path, and the like, by using a text message service or the like to the counterpart terminal, the user drives the text message creation application and displays it on a sub-window (See FIG. 14A).

When a certain signal is input, the controller 180 input an application executed in the main window, namely, information process by the navigation, to the application being executed in the sub-window, namely, to the text message creation application (See FIG. 14B).

The certain signal may be a signal of dragging the map being displayed on the main window and dropping it to the sub-window on which the text message creation application is executed, by the user.

The information processed by the navigation may refer to coordinate information of the map currently displayed, the location information regarding the user's current location, destination, and the like, movement path information, vicinity area information, and/or image information obtained by converting the map currently displayed on the main window into an image format, or the like through a screen capture, or the like.

When the information is inputted to the text message creation application of the sub-window, the coordinate information, the location information, the movement path information, the vicinity area information and/or image information as received is displayed on a text message creation window, and a text message, a phone number of a counterpart, and the like, are received from the user and the information is transmitted to the counterpart terminal.

Upon receiving the message including the information, the terminal discriminately displays the coordinate information, the location information, the movement path information, the vicinity area information and/or image information of the message (See FIG. 14C). When the user selects the displayed location information, and the like, through a touch, or the like, the controller 180 detects it, drives the navigation, and displays the map of a point related to the received corresponding information on the main window or the sub-window. The user's current location, destination, a movement path, vicinity area information, and the like, may be displayed on the map according to the received information.

FIGS. 15A to 15D are views showing transmitting and receiving a message through a sub-window while a broadcast program is being viewed through a main window according to an exemplary embodiment of the present invention.

When the user drives a broadcast view application or various video reproducing application of the mobile terminal, a video such as a broadcast, or the like, is displayed through a main window occupying the entire screen. When the user wants to transmit information regarding the currently displayed video by using a text message service or the like to the counterpart terminal, the user drives the text message creation application and displays it on a sub-window as described above (See FIG. 15A).

Figure 15A:
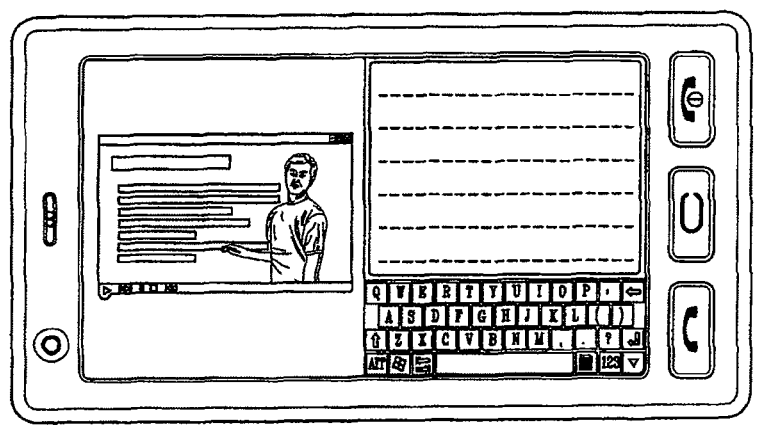
FIGS. 15A to 15D are views showing transmitting and receiving a message through a sub-window while a broadcast program is being viewed through a main window according to an exemplary embodiment of the present invention.
Figure 15B:
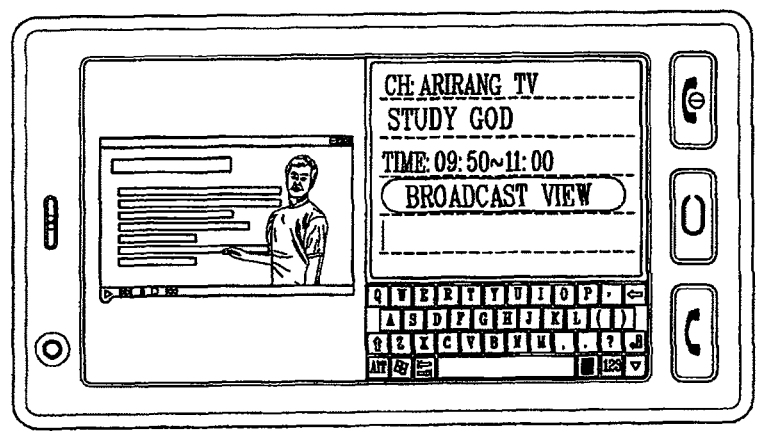

When a certain signal is input, the controller 180 input an application executed in the main window, namely, information process by the broadcast view application, to the application being executed in the sub-window, namely, to the text message creation application (See FIG. 15B).

The certain signal may be a signal of dragging the video being displayed on the main window and dropping it to the sub-window on which the text message creation application is executed, by the user.

The information processed by the broadcast view application may refer to channel information of a currently reproduced program, title, information regarding a broadcast time, image information captured during the reproducing operation, and the like. In case of the video reproducing application, the information processed by the video reproducing application refer to information regarding a file name of the video being reproduced, a contents title, an access address related to a VOD, and the like, the position of a currently reproduced frame, an image captured during the reproducing operation, and the like.

When the information is input to the text message creation application of the sub-window, the program information and/or image information as received is displayed on a text message creation window, and a text message, a phone number of a counterpart, and the like, are received from the user and the information is transmitted to the counterpart terminal.

Figure 15C:
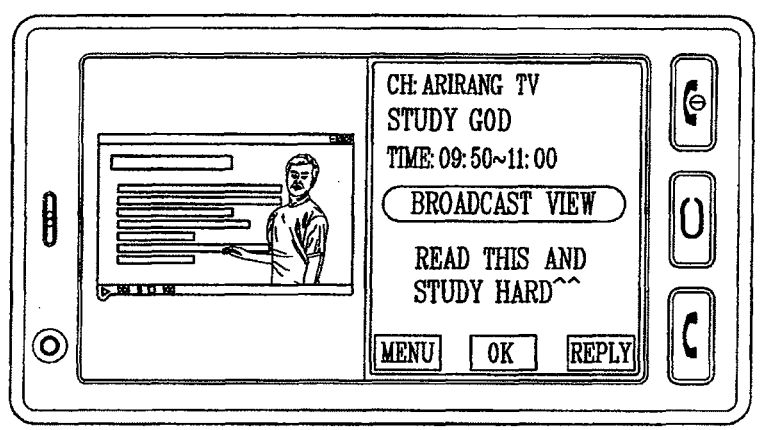
Figure 15D:
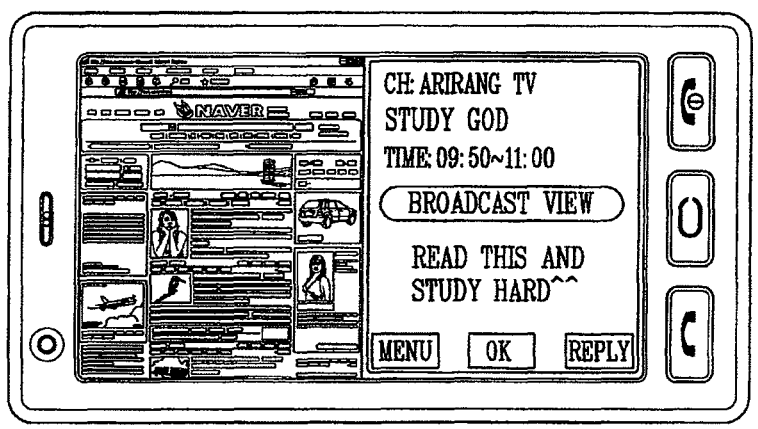

Upon receiving the message including the information, the terminal discriminately displays the program information and/or image information of the message (See FIG. 15C). When the user selects the displayed program information, and the like, through a touch, or the like, the controller 180 detects it, drives the broadcast view application or the video reproducing application and reproduces a program or a video related to the received corresponding information. When frame information of a particular position of the video is included to be received, the reproducing may be started from the corresponding frame (See FIG. 15D).

In the above embodiment, the Web browser, navigation, broadcast view application or video reproducing application, the message creation application, and the like, have been described, but the present invention is not limited thereto. For example, an application that is able to exchange information simultaneously executed and processed may include a camera-related application, a voice/video call, text/video chatting, an E-book reader, a document editor, various games, a phone book, and the like.

Information delivered from one application (e.g., which is displayed through a main window) being executed to another application (e.g., which is displayed through a sub-window) being executed may be image information obtained by capturing the main window.

Also, the delivered information may be particular information which is input/output or processed according to an executed application. For example, in case of a camera-related application, the delivered information may be an image captured by the camera or a preview image. In case of the E-book reader, the title or author of an E-book being currently displayed, a page or a sentence being displayed, or E-book file information being displayed. In case of a phone book-related application, the delivered information may be information such as a name, a phone number, an e-mail, an address, an image, and the like, selected by the user. As for each information, a certain identifier for identifying the type of each information may be added to the information and then delivered, or the information may be converted into a certain format and then delivered.

In an exemplary embodiment of the present invention, the information delivered between applications may be determined according to the application executed in the main window and/or the sub-window, or information to be delivered may be selected according to a user selection.

In the above description, the message creation application is mainly described as the application executed in the sub-window, but the present invention is not limited thereto. For example, the application which receives information from another application being executed may include a video call, video/text chatting, a document creator, and the like, as well as the text message creation application. The information delivered from the application being executed in the main window may be processed by the application executed in the sub-window. For example, in case of a video call-related application, a received image may be transmitted as a substitute image to a counterpart or various types of information received via a data channel, or the like, may be transmitted to the counterpart.

FIG. 16 is a flow chart illustrating the process of the exemplary embodiments described with reference to FIGS. 13A to 15D.

When an application to be executed is selected by the user, the controller 180 drives the application APP1 and displays it through a main window occupying the entire screen (step S510). While the application APP1 is being driven, when an event occurs and a command for resizing the main window is input by the user or when another application APP2 to be executed simultaneously is selected by the user, the controller reduces the main window and displays a sub-window displaying the APP2 (including information or the application related to the generated event) along with the main window (step S520).

In the state in which the main window and the sub-window are simultaneously displayed, when a certain input, for example, a touch input for dragging from the main window to the sub-window is detected, the controller 180 inputs the information related to the application APP1, e.g., information processed by the application APP1, information inputted to be processed by the application APP1, information processed by the application APP1 and output, and the like, so that the corresponding information can be processed by the application APP2 (step S540).

The controller 180 processes the input information by the application APP2 and performs a certain function according to the application APP2.

In the embodiments of the present disclosure, the above-described method can be implemented as codes that can be read by a processor in a program-recorded medium. The processor-readable medium includes a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

The exemplary embodiments of the present disclosure have been described with reference to the accompanying drawings.

The terms used in the present application are merely used to describe particular embodiments, and are not intended to limit the present disclosure.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
a touch screen; and
a controller configured to control an operating system of the mobile terminal to:
display information of a first application on the touch screen in response to a selection of the first application to execute the first application;
display, on the display unit, the list of applications to be executed when a user request is received for displaying the list of application, wherein the list of applications is not displayed before the user request is received; and
receive, from the list of applications, a selection of a second application to execute the second application and respectively display the information of the first application in a first window and information of the second application in a second window on the display unit,
wherein both of the first window and the second window are displayed on the touch screen,
wherein the list of applications is disappeared from the touch screen when the second application is executed on the second window, and
wherein the first application executed in the first window is different from the second application executed in the second window.

2. The mobile terminal of claim 1, wherein the list of applications comprises a plurality of applications available for multitasking.

3. The mobile terminal of claim 1, wherein the list of applications are hidden from view when the second application is executed on the second window.

4. The mobile terminal of claim 1, wherein the first window is a main window and the second window is a sub-window.

5. The mobile terminal of claim 1, wherein the list of applications comprises at least one of a voice call application, a video call application, a text message application, a text chatting application, a game application, a mobile internet application, a DMB application, a navigation application, an E-book reader application, a camera application, a phone book application, or a document creator application.

6. The mobile terminal of claim 1, wherein the controller is further configured to display a horizontal bar at an edge of the first window, and to resize the first window when the horizontal bar is dragged through the touch screen.

7. The mobile terminal of claim 1, wherein the controller is further configured to display on the touch screen an indicator indicating an occurrence of an event,
wherein the event is a video call signal, a call signal reception, a text message reception, or an alarm event, and
wherein the controller is further configured to:
display a text message associated with the text message reception in response to an input thereof; and
display an edit window for replying to the text message in response to an input thereof.

8. The mobile terminal of claim 7, wherein the indicator is in a form of an icon or a character box.

9. The mobile terminal of claim 1, wherein the first application is a web-browser and the second application is a text message application.

10. The mobile terminal of claim 9, wherein information processed by the web-browser is applied to the text message application in response to an input thereof.

11. The mobile terminal of claim 1, wherein a position of the first window is exchanged with a position of the second window in response to an input thereof.

12. The mobile terminal of claim 1, wherein the size of the first window is enlarged to be equal to the size of the touch screen if the second window is closed in response to a touch input to a first designated key on the touch screen, and
wherein the size of the second window is enlarged to be equal to the size of the touch screen if the first window is closed in response to a touch input to a second designated key on the touch screen.

13. The mobile terminal of claim 1, wherein the touch screen is divided to simultaneously display the first window and the second window on a same layer.

14. The mobile terminal of claim 1, wherein the size of the first window is reduced to be equal to the size of the second window in response to the selection of the second application.

15. A method for controlling a mobile terminal, the method comprising:
controlling an operating system of the mobile terminal to:
display information of a first application on a touch screen of the mobile terminal in response to a selection of the first application to execute the first application;
display, on the touch screen, the list of applications to be executed when a user request is received for displaying the list of application, wherein the list of applications is not displayed before the user request is received; and
receive, from the list of applications, a selection of a second application to execute the second application and respectively display the information of the first application in the first window and information of the second application in a second window on the display unit,
wherein both of the first window and the second window are displayed on the touch screen,
wherein the list of applications is diapered on the touch screen when the second application is executed on the second window, and
wherein the first application executed in the first window is different from the second application executed in the second window.

16. The method of claim 15, wherein the list of applications comprises a plurality of applications available for multitasking.

17. The method of claim 15, wherein the executing the second application comprises disappearing the list of applications from view.

18. The method of claim 15, further comprising:
displaying a horizontal bar at an edge of the first window; and
resizing the first window when the horizontal bar is dragged through the touch screen.

* * * * *